J. A. DAY.
ROD SOCKET OR COUPLING.
APPLICATION FILED MAY 1, 1920.
1,379,903.
Patented May 31, 1921.
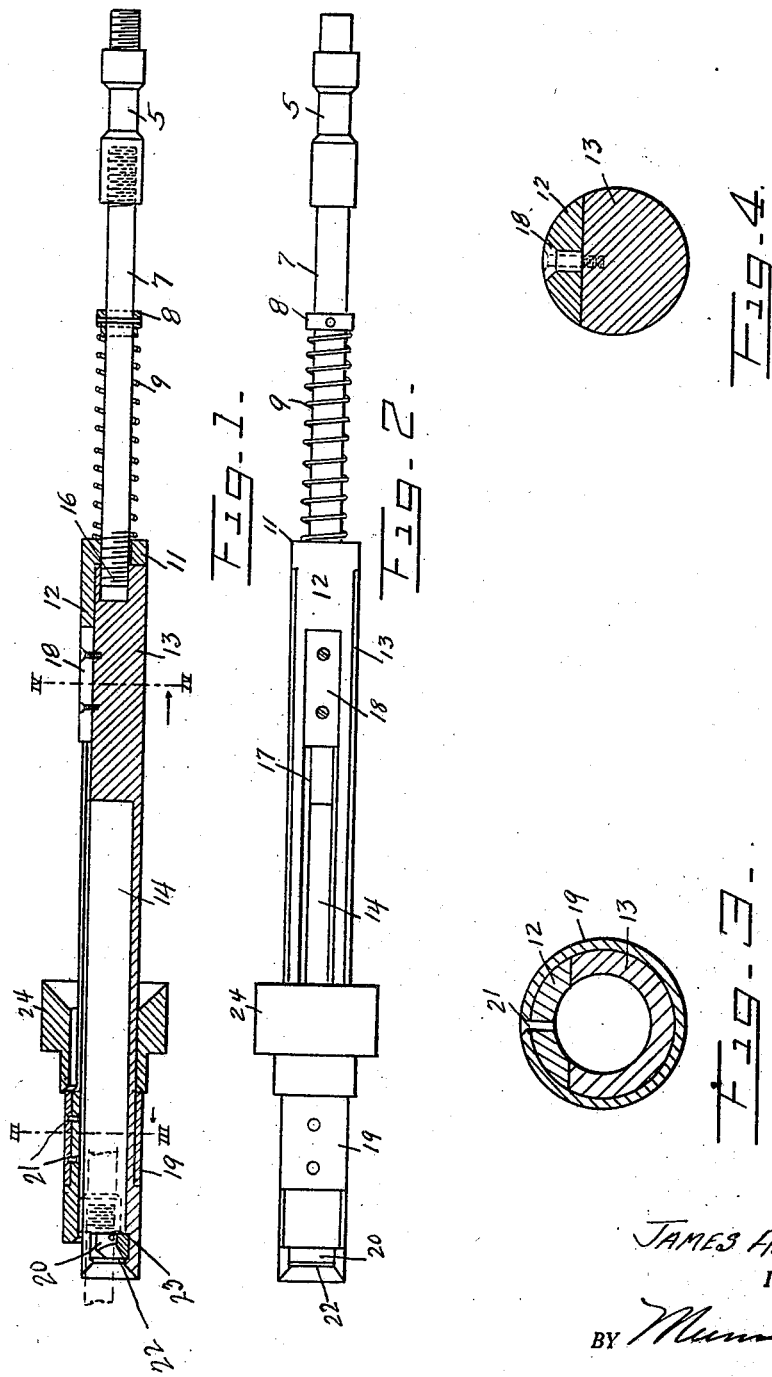
JAMES A. DAY
INVENTOR.
BY
ATTORNEYS.

UNITED STATES PATENT OFFICE.

JAMES A. DAY, OF OILFIELDS, CALIFORNIA.

ROD SOCKET OR COUPLING.

1,379,903.  Specification of Letters Patent.  Patented May 31, 1921.

Application filed May 1, 1920. Serial No. 378,225.

*To all whom it may concern:*

Be it known that I, JAMES A. DAY, a citizen of the United States, residing at Oilfields, in the county of Fresno and State of California, have invented a new and useful Rod Socket or Coupling, of which the following is a specification.

The principal object of this invention is to produce a rod socket which may be lowered into an oil well for the purpose of recovering a broken sucker rod, which may be lost within the well.

In oil practice these sucker rods are jointed and often times these sucker rods break at or near the joint due to the excessive strains under which they operate, and this invention is for the purpose of recovering these broken sucker rods.

Another object is to produce a rod socket which is simple in construction and one which may be operated by an inexperienced person.

Another object is to produce a rod socket of this character which will stand the excessive strain incident to the pulling of a well.

Another object is to produce a rod socket, which through its simplicity, will be cheap to manufacture.

Other objects and advantages will be seen as the description proceeds.

In this specification and the annexed drawings the invention is illustrated in the form considered to be the best, but it is to be understood that the invention is not limited to such form because it may be embodied in other forms, and it is also to be understood that in and by the claims following the description, it is desired to cover the invention in whatsoever form it may be embodied.

In the accompanying drawing:

Figure 1—is a side elevation partly in cross section of my improved rod socket.

Fig. 2—is a top plan view of my rod socket as shown in Fig. 1.

Fig. 3—is a cross section of my rod socket taken on the line 3—3, Fig. 1.

Fig. 4—is a cross section of my rod socket taken on the line 4—4, of Fig. 1.

In the drawings like numerals refer to corresponding parts in several views.

Referring to Fig. 1, the numeral 5 designates a rod socket of ordinary construction, which rod socket is adapted to be screwed upon the end of a sucker rod and into the female screw to an adjoining sucker rod. In the present instance, I screw into the socket 5 a rod 7, which rod carries a collar 8 here shown pinned to the rod 7. It is obvious, however, that the collar 8 may be attached to the rod 7 in any well known and convenient manner. This collar 8 forms an abutment for one end of a spring 9, which spring also surrounds the rod 7 and has its opposite end in contact with an L shaped portion 11 of a slide 12. This slide 12 moves upon a substantially semi-circular member 13, which is provided with a hollow socket portion 14 and is held upon the rod 7 by a screw threaded engagement 16. The slide 12 is provided with a longitudinal slideway 17 having tapering sides. This slide 12 is held in contact with the member 13 by a block 18 contacting the tapering sides of the slideway 17.

The opposite end of the slide 12 is held in contact with the member 13 by means of a ring 19 here shown attached thereto by rivets 21. At the point 22 I have placed a cam member 20 which is adapted to project under the shoulder of a broken socket (here shown in dotted lines) and for this purpose I provide a flat face 23 which will prevent the withdrawal of the broken socket after the same has once been engaged.

The numeral 24 designates a ring adapted to be engaged as my device is drawn out of a well tubing for the purpose of further assisting in keeping the slide 12 closed as the same is withdrawn from a well tubing.

In operation my device is dropped in a well and the ring 24 will be held at the top of the tubing while the rod socket descends. Upon striking the end of the broken socket the slide 12 will be pushed upwardly against the tension of a spring 9 and further downward movement of the socket as a whole will cause the member 22 having the flat face 23 come in contact with the under side of the broken rod socket. As soon as this occurs the spring 9 will act to cause the slide 12 to again move into its normal position and, owing to the presence of the ring 19, the lower portion of the slide is prevented from spreading with the result that the broken socket is firmly held in my device and is then ready for upward travel. As soon as the socket starts to leave the ground the ring 24 will slide on to the same and engage the ring 19 further strengthening the device and preventing spreading the parts which, up to this time, has been in some degree prevented by the presence of a well tubing.

I claim:

1. In a rod socket, a rod, a semi-circular member attached to said rod, a slide adapted to move on said semi-circular member, said slide and said semi-circular member forming a cylindrical socket, said slide having an L-shaped portion in sliding engagement with said rod, a spring mounted on said rod for the purpose of maintaining said L shaped portion in contact with the end of said semi-circular member, and means for preventing the free end of said slide from disengagement with said semi-circular member.

2. In a rod socket, a rod, a semi-circular member attached to said rod, a slide adapted to move on said semi-circular member, said slide and said semi-circular member forming a cylindrical socket, said slide having an L shaped portion in sliding engagement with said rod, a spring mounted on said rod for the purpose of maintaining said L shaped portion in contact with the end of said semi-circular member, means for preventing the free end of said slide from disengagement with said semi-circular member and a cam mounted in said socket, said cam having a flat inner face.

JAMES A. DAY.